(12) United States Patent
Kiskiras et al.

(10) Patent No.: US 8,056,953 B2
(45) Date of Patent: Nov. 15, 2011

(54) THERMAL BARRIER SYSTEM

(75) Inventors: Charles John Kiskiras, Colorado Springs, CO (US); Michael B. Rembert, Woodville, AL (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 12/138,550

(22) Filed: Jun. 13, 2008

(65) Prior Publication Data
US 2009/0308022 A1 Dec. 17, 2009

(51) Int. Cl.
*B60R 13/08* (2006.01)
(52) U.S. Cl. ............ 296/39.3; 296/181.6; 296/901.01; 52/309.4; 52/794.1
(58) Field of Classification Search ............ 296/39.3, 296/211, 181.6, 901.01; 52/794.1, 795.1, 52/309.4; 428/316.6
See application file for complete search history.

(56) References Cited

U.S. PATENT DOCUMENTS

| | | | | |
|---|---|---|---|---|
| 1,890,418 A * | 12/1932 | Krnst | ............... | 428/76 |
| 1,910,703 A * | 5/1933 | Le Grand | ............... | 52/261 |
| 2,137,324 A * | 11/1938 | Wallach | ............... | 296/211 |
| 2,223,395 A * | 12/1940 | Van Buren | ............... | 296/39.3 |
| 2,250,510 A * | 7/1941 | Van Buren | ............... | 296/39.3 |
| 4,057,519 A * | 11/1977 | Summers et al. | ............... | 521/122 |
| 4,188,761 A * | 2/1980 | McKay | ............... | 52/474 |
| 4,324,834 A * | 4/1982 | Page et al. | ............... | 428/312.6 |
| 5,100,725 A * | 3/1992 | Pearson | ............... | 428/314.4 |
| 5,108,817 A * | 4/1992 | Kidd et al. | ............... | 428/192 |
| 5,230,941 A * | 7/1993 | Hollander et al. | ............... | 428/116 |
| 5,491,945 A * | 2/1996 | Meirick | ............... | 52/309.11 |
| 5,536,562 A | 7/1996 | Tran et al. | | |
| 5,837,739 A | 11/1998 | Nowak et al. | | |
| 5,985,405 A | 11/1999 | Doucette, Jr. et al. | | |
| 6,114,003 A | 9/2000 | Gottfried | | |
| 6,152,363 A | 11/2000 | Rule, Jr. | | |
| 6,280,814 B1 | 8/2001 | Offermann et al. | | |
| 6,609,747 B1 * | 8/2003 | Ruiz | ............... | 296/95.1 |

(Continued)

FOREIGN PATENT DOCUMENTS

DE     102004014248 A1     10/2005

(Continued)

OTHER PUBLICATIONS

European Search Report for EP 09162364, dated Nov. 11, 2009.

*Primary Examiner* — Dennis Pedder
(74) *Attorney, Agent, or Firm* — Edell, Shapiro & Finnan, LLC

(57) ABSTRACT

A thermal barrier system includes a plurality of panels including at least two panels separated from each other so as to define a space between the panels, where each panel of the at least two panels is separated from another panel via at least one spacer structure. Each panel is further formed of an insulation material having a thermal conductivity in the range of about 0.023 W/(m*K) to about 0.099 W/(m*K). In an example embodiment, the insulation material forming the panels has a density of no greater than about 30 lb/ft³. In another example embodiment, the insulation material includes a silicone syntactic foam material.

21 Claims, 4 Drawing Sheets

U.S. PATENT DOCUMENTS

| | | |
|---|---|---|
| 6,860,082 B1 * | 3/2005 | Yamamoto et al. .......... 52/794.1 |
| 6,864,297 B2 | 3/2005 | Nutt et al. |
| 6,988,765 B2 * | 1/2006 | Nagayama et al. ........... 296/211 |
| 7,093,787 B2 | 8/2006 | Garrettson et al. |
| 2002/0185893 A1 * | 12/2002 | Hashirayama et al. ....... 296/204 |
| 2006/0182943 A1 | 8/2006 | Eyhorn |
| 2007/0116978 A1 | 5/2007 | Starr |
| 2008/0032114 A1 | 2/2008 | Squires et al. |
| 2008/0199682 A1 * | 8/2008 | Browne ..................... 428/319.1 |
| 2010/0136320 A1 * | 6/2010 | Matviya ..................... 428/316.6 |

FOREIGN PATENT DOCUMENTS

| | | | |
|---|---|---|---|
| FR | 2907787 A1 | | 5/2008 |
| JP | 7237274 A | | 9/1995 |
| JP | 9278923 A | | 10/1997 |
| JP | 2005194696 | * | 7/2005 |
| JP | 2006-112097 | * | 4/2006 |

* cited by examiner

THERMAL BARRIER SYSTEM

BACKGROUND

Thermal barriers are provided for a number of different applications to shield and protect people and/or items from exposure to dangerous temperatures by minimizing the transfer of heat between an outer or exposed surface and an inner surface of the barrier which faces an enclosure or environment occupied by one or more persons and/or items to be protected. Examples of applications in which thermal barriers are provided are aerospace applications (i.e., to insulate the walls of the aerospace vessel from excessively cold or warm temperatures), fire protection enclosures, airplanes and automobiles.

Thermal barriers can be large, bulky and heavy, making such barriers difficult for use for certain applications. It is therefore desirable to provide a thermal barrier that is lightweight and effective in providing a shield against excessive thermal heat and radiation.

SUMMARY

A thermal barrier system comprises a plurality of panels including at least two panels separated from each other so as to define a space between the panels, where each panel of the at least two panels is separated from another panel via at least one spacer structure. Each panel is further formed of an insulation material having a thermal conductivity in the range of about 0.023 to about 0.099 W/(m*K). In an example embodiment, the insulation material forming the panels includes a silicone syntactic foam material.

The panels can be separated from each other using at least one spacer structure, where the at least one spacer structure can be formed from the same insulation material as the panels. The space formed between panels can be filled with any insulating medium, such as air.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

A thermal barrier system includes a plurality of panels connected together and suitably spaced from each other such that an air gap is defined between each pair or set of adjacent panels in the barrier system, where the panels comprise a heat resistant material with a sufficiently low thermal conductivity to effectively minimize heat transfer through the barrier system. The barrier system can include any number of panels (e.g., two, three, four or more panels) depending upon a particular application.

Each panel of the thermal barrier system is preferably constructed of a suitable material that has a low thermal conductivity in the range of about 0.023 W/(m*K) to about 0.099 W/(m*K). In addition, the material preferably has a low density of no greater than about 30 lb/ft$^3$ (about 481 kg/m$^3$), more preferably in a range from about 4 lb/ft$^3$ (about 64 kg/m$^3$) to about 25 lb/ft$^3$ (about 400 kg/m$^3$). An example material for use in constructing the panels of the barrier system is a silicone material, such as a silicone syntactic foam material. A preferred silicone syntactic foam material that is used to form the panels of the thermal barrier system is commercially available under the trademark ACUSIL or ACUSIL II (ITT Corporation, New York).

The silicone syntactic foam material comprises a matrix of hollow silicone structures, e.g., microspheres, that are combined and/or fused together. The syntactic foam structure provides a low density, lightweight characteristic for the material while having a low thermal conductivity due to the physical nature of the silicone material and also the air content within the microsphere structures. A suitable silicone syntactic foam material (e.g., an ACUSIL material) can be selected so as to have a thermal conductivity within the range of about 0.050-0.055 W/(m*K) (e.g., about 0.053 W/(m*K)) and a density of about 15 lb/ft$^3$ (about 240 kg/m$^3$) to about 17 lb/ft$^3$ (about 272 kg/m$^3$). In addition, in an example embodiment the microspheres within the syntactic foam material are in the range from about 55 micrometers (microns) to about 70 microns. Utilizing silicone syntactic foam for the panels provides enhanced insulation properties and reduces the weight of each panel in relation to panels using a solid and more dense insulator material. However, the thermal barrier system can include one or more combinations of silicone and/or other types of insulator materials having different thermal conductivities, where the thermal conductivities of the different materials are preferably within the range noted above.

Figure 1:
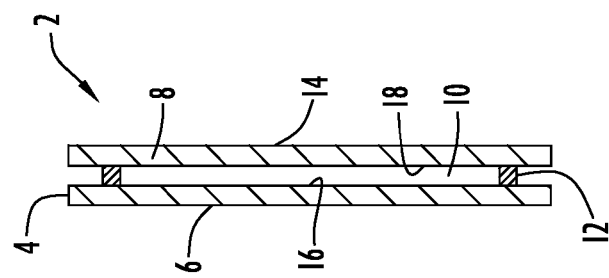
FIG. 1 is a cross-sectional view of a thermal barrier system including two panels and an insulating air gap between the panels.

An example of an embodiment of a thermal barrier system is depicted in FIG. 1. In this embodiment, thermal barrier system 2 includes a first panel 4 and a second panel 8 secured to each other with a plurality of spacers 12. In particular, an interior surface 16 of first panel 4 is connected to an interior surface 18 of panel 8 (which faces toward first panel surface 16) by spacers 12. The spacers can also be constructed of a silicone syntactic foam material (e.g., ACUSIL material, as described above). However, as noted above, the panels and/or spacers can also be formed of different materials having different thermal conductivities.

The spacers 12 are suitably dimensioned so as to define a gap or space in the form of an air gap 10 between the pair of panels 4, 8. The thickness dimensions of the panels and spacers can be set to any suitable dimensions to facilitate adequate thermal insulation between outer surface 6 of panel 4 and outer surface 14 of panel 8. A preferred thickness range for each of the panels and the spacers is from about 0.10 inch (about 0.254 cm) to about 0.20 inches (about 0.508 cm), where each of the panels and spacers can have the same or different thickness dimensions depending upon a particular application in which the thermal barrier system is utilized. As can be seen from FIG. 1, the thickness dimension of the spacers 12 also defines a thickness dimension of the air gap 10 extending between interior surfaces 16, 18 of the panels 4, 8.

While the space or gap between a pair of adjacent panels in the thermal barrier system includes air, it is noted that the space could alternatively be filled or enclosed with any other suitable insulating medium, including one or more insulating gases, liquids or solids. However, it is noted that air is a preferable fluid or medium to be provided in the space or gap between panels, because of its low thermal conductivity properties while maintaining the lightweight features of the thermal barrier system. The space between adjacent panels can further be enclosed by a spacer structure extending around the periphery of the facing surfaces which connect the two adjacent panels (e.g., so as to form an edge seal for the space defined between the two adjacent panels).

In an example embodiment, each of the panels and spacers can have the same or substantially similar thickness of about 0.2 inch (about 0.5 cm), which will also result in an air gap thickness between the first and second panels of about 0.2 inch (about 0.5 cm). In another example embodiment, each of the panels and spacers have a thickness of about 0.1 inch (about 0.25 cm). In another example embodiment, the panels have a thickness of about 0.2 inch (about 0.5 cm), while the spacers have a thickness of about 0.1 inch (about 0.25 cm).

Other dimensions of the panels and spacers (e.g., length, width, diameter) and also geometric configurations of the panels and spacers (e.g., square, rectangular, triangular, round, oval, symmetrically shaped, asymmetrically or irregular shaped, etc.) are also possible, and the selection of such dimensions and geometric configurations can be selected based upon a particular application for which the thermal barrier system is implemented.

Figure 2A:
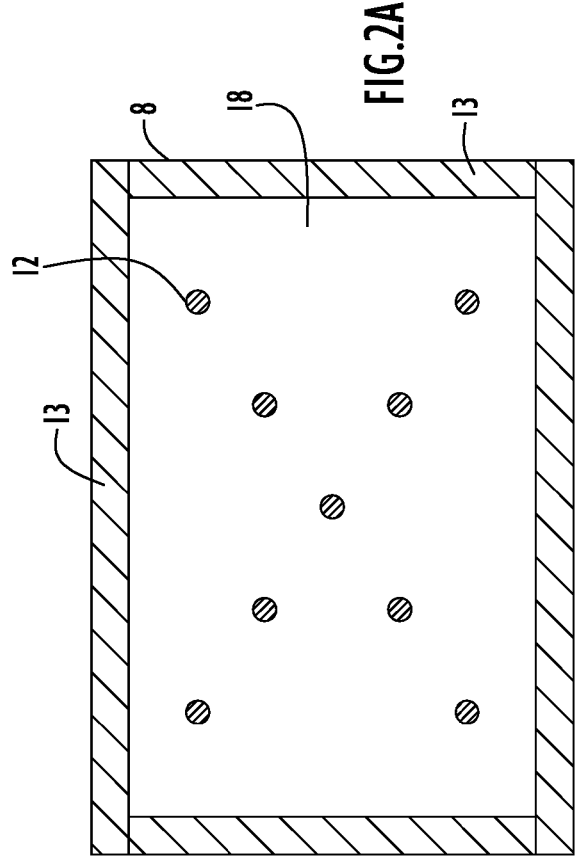
FIG. 2A is a view of one panel of a thermal barrier system including an example of an arrangement of spacers connected to the panel.
Figure 2B:
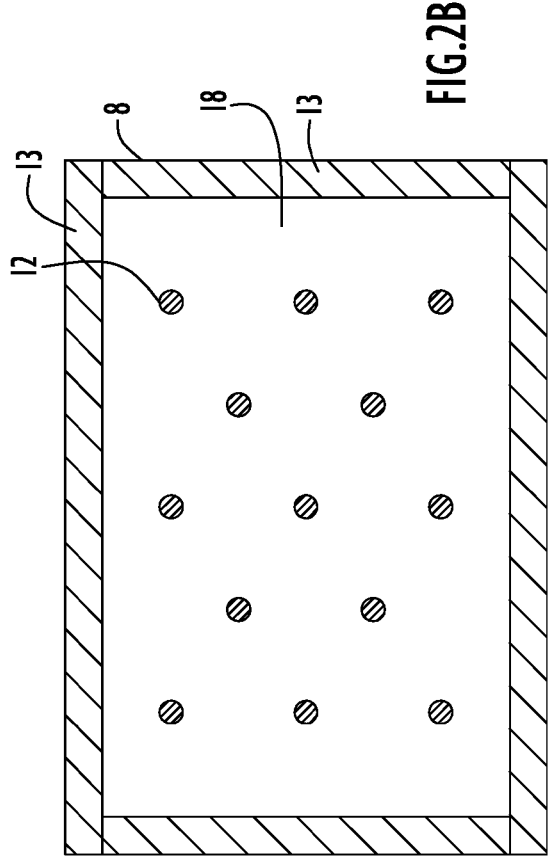
FIG. 2B is a view of one panel of a thermal barrier system including another example of an arrangement of spacers connected to the panel.

It is noted that any suitable number of spacers (e.g., one spacer or two or more spacers) can be provided in any suitable arrangement to connect a pair of panels of the thermal barrier system together. Two examples of spacer arrangements are shown in FIGS. 2A and 2B. In particular, FIG. 2A shows a spacer arrangement, in which a plurality of spacers 12 are secured to interior surface 18 of panel 8 (and also to interior surface 16 of panel 6) and are arranged along two intersecting lines so as to form an "X" pattern along surface 18. The second panel 8 has a rectangular geometry, and the spacer 12 that forms the point of intersection for the two lines along which the spacers 12 are arranged is disposed at about the center location of the panel. In FIG. 2B, the spacer arrangement includes the "X" pattern of spacers 12 as well as additional spacers located between the two intersecting lines of spacers along surface 18. In addition, spacer strips 13 are provided along the periphery of each panel shown in FIGS. 2A and 2B.

In the embodiments shown in FIGS. 2A and 2B, the spacers 12 have a circular geometry with a diameter of about 0.5 inch (about 1.27 cm) and the spacer strips 13 have a width of about 0.5 inch (about 1.27 cm) and have suitable lengths to form around the periphery of each panel. The spacer arrangements are also symmetrical along the surfaces of the panels. However, it is noted that any two or more spacers can have different geometries and/or different dimensions and can further be spaced in any symmetrical or asymmetrical pattern along the panel surfaces.

The panels can be secured to the spacers in any suitable manner (e.g., via adhesive bonding, thermal bonding, mechanical connections, etc.). For example, the interior surfaces of the panels can be secured to the spacers via a silicone adhesive, such as a silicone adhesive commercially available under the trademark SYLGARD (Dow Corning Corporation, Michigan).

The combination of insulation panel/air gap/insulation panel in the thermal barrier system provides an effective barrier to extreme temperatures (hot or cold) existing between the outer or external surfaces 6, 14 of the first and second panels 4, 8. It has been determined that the two panel system can provide an effective thermal barrier that results in a temperature gradient between the two exterior surfaces of the two panels by at least about 400° F. (about 220° C.), where the temperature gradient depends upon the source temperature to which the system is exposed. A greater temperature difference between the two outermost or exterior surfaces of panels forming the thermal barrier system can also be achieved when combining additional panels and air gaps in the system (e.g., using a thermal barrier system with three or more panels and a plurality of air gaps). For example, a temperature gradient from about 295° F. (about 164° C.) to about 730° F. (about 406° C.) can be obtained between the two outermost or exterior surfaces of panels for a multiple panel system including three or more panels using air gaps in the manner described for the previous embodiment (where the temperature difference will depend upon the source temperature at which the system is exposed).

The thermal barrier system described above can be modified by providing a reflective material over one or more interior and/or exterior surfaces of panels of the system. The reflective material layer provides a further enhancement to minimize thermal radiation from penetrating the panel. The reflective material can be in the form of a foil, sheet or film applied to one or more panel surfaces, with one or more layers of reflective material being applied to the panel surface. For example, the reflective material can comprise aluminum, gold and/or stainless steel foil (e.g., foil having a thickness of about 2-3 mils or 0.002-0.003 inch (0.005-0.0076 cm)). The reflective material can further be adhered to the panel surfaces in any suitable manner (e.g., using a silicone adhesive such as described above).

Figure 4:
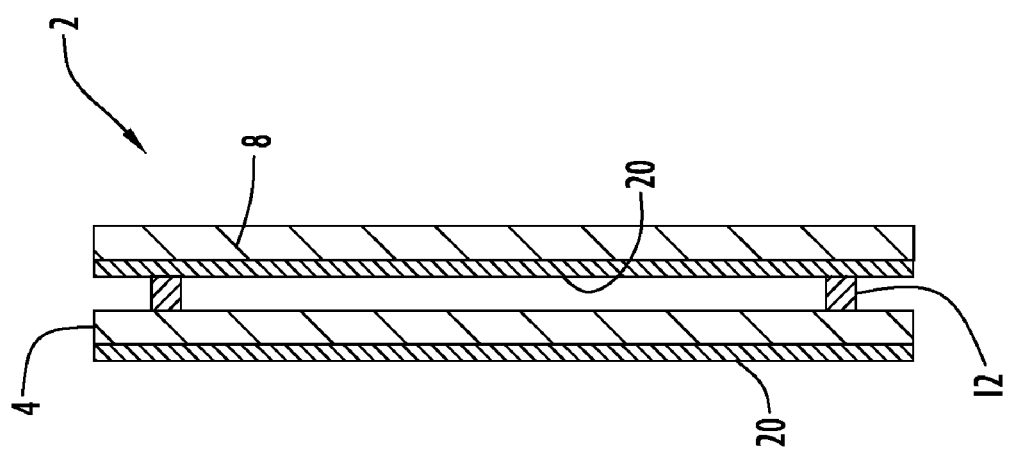
FIG. 4 is cross-sectional view of the thermal barrier of FIG. 1 further including reflective foil layers disposed along a surface of a first panel that defines an outer wall of the thermal barrier and also along a wall of a second panel that faces toward the first panel.
Figure 3:
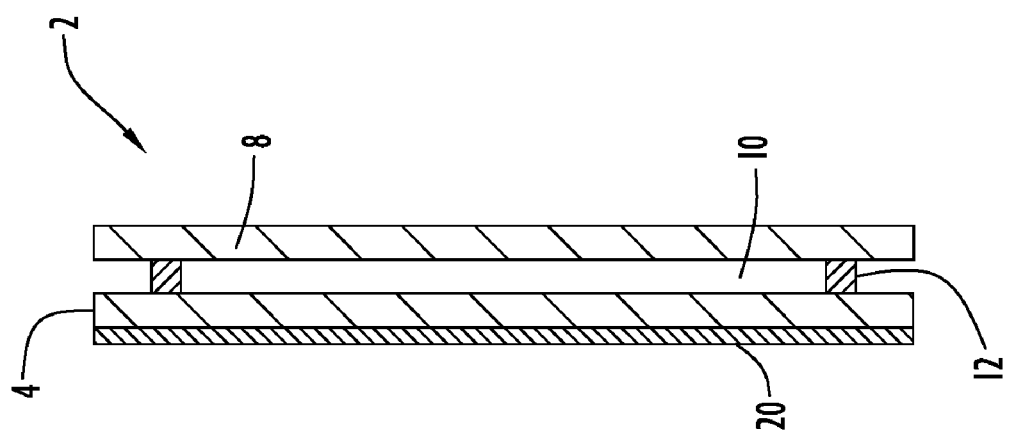
FIG. 3 is a cross-sectional view of the thermal barrier system of FIG. 1 further including a reflective foil layer disposed along a surface of a first panel that defines an outer wall of the thermal barrier.

FIGS. 3 and 4 depict modified embodiments of the system of FIG. 1. In particular, FIG. 3 depicts the barrier system similar to that of FIG. 1 and further including a reflective foil layer 20 disposed on exterior surface 6 of panel 4, while FIG. 4 depicts the barrier system including a reflective foil layer 20 disposed on exterior surface 6 of panel 4 and also on interior surface 18 of panel 8. Further embodiments are also possible, such as providing a reflective material on any number of interior and/or exterior surfaces of any two or more panels.

As noted above, the thermal barrier system can include more than two panels (e.g., three panels, four panels, or more). A three-panel system is shown in the embodiment in FIG. 5, in which a first panel 4 is connected to a second panel 8 via spacers 12 that bridge the facing surfaces 16, 18 of the first and second panels, and the second panel 8 is connected to a third panel 24 via spacers 12 that bridge the facing surfaces 14, 26 of the second and third panels. This three-panel thermal barrier system provides an effective shield against heat transfer between the outer surfaces 6, 28 of the first panel 4 and the third panel 24. While not shown, reflective material layers can also be provided along any selected surfaces of the multiple panel system (e.g., along surfaces 6, 18 and 26 of the three-panel barrier system).

The thermal barrier system can be implemented as a firewall or thermal protection wall for any system, device, mobile vehicle, shelter or any other structure in which it is desirable to protect people, mechanical or electronic equipment and/or any other items from extreme hot or cold temperatures (e.g., temperatures which deviate significantly from an ambient temperature range of about 64° F. (about 18° C.) to about 75° F. (about 24° C.)). Examples in which the thermal barrier system can be implemented include, without limitation, within walls of a building to serve as a fire barrier, within walls of the body or any other supporting structure of an automobile (e.g., in cars designed for auto racing), and in outer wall and/or other supporting structures for aerospace vehicles.

Figure 5:
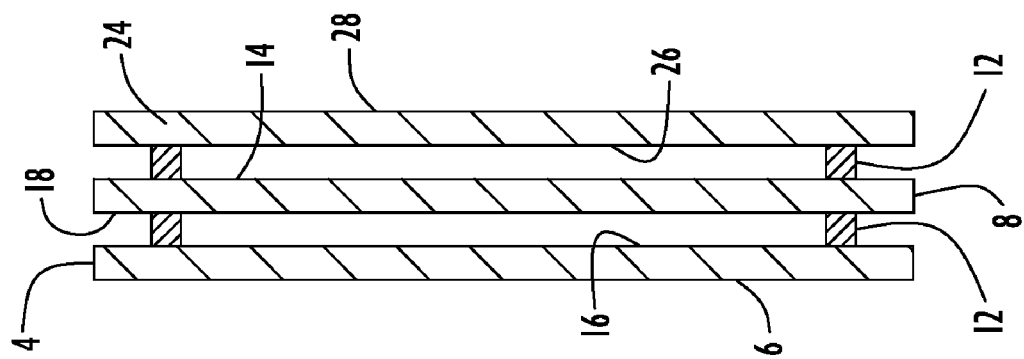
FIG. 5 is a cross-sectional view of a thermal barrier system including three panels with an insulating air gap disposed between each set of adjacent panels.
Figure 6:
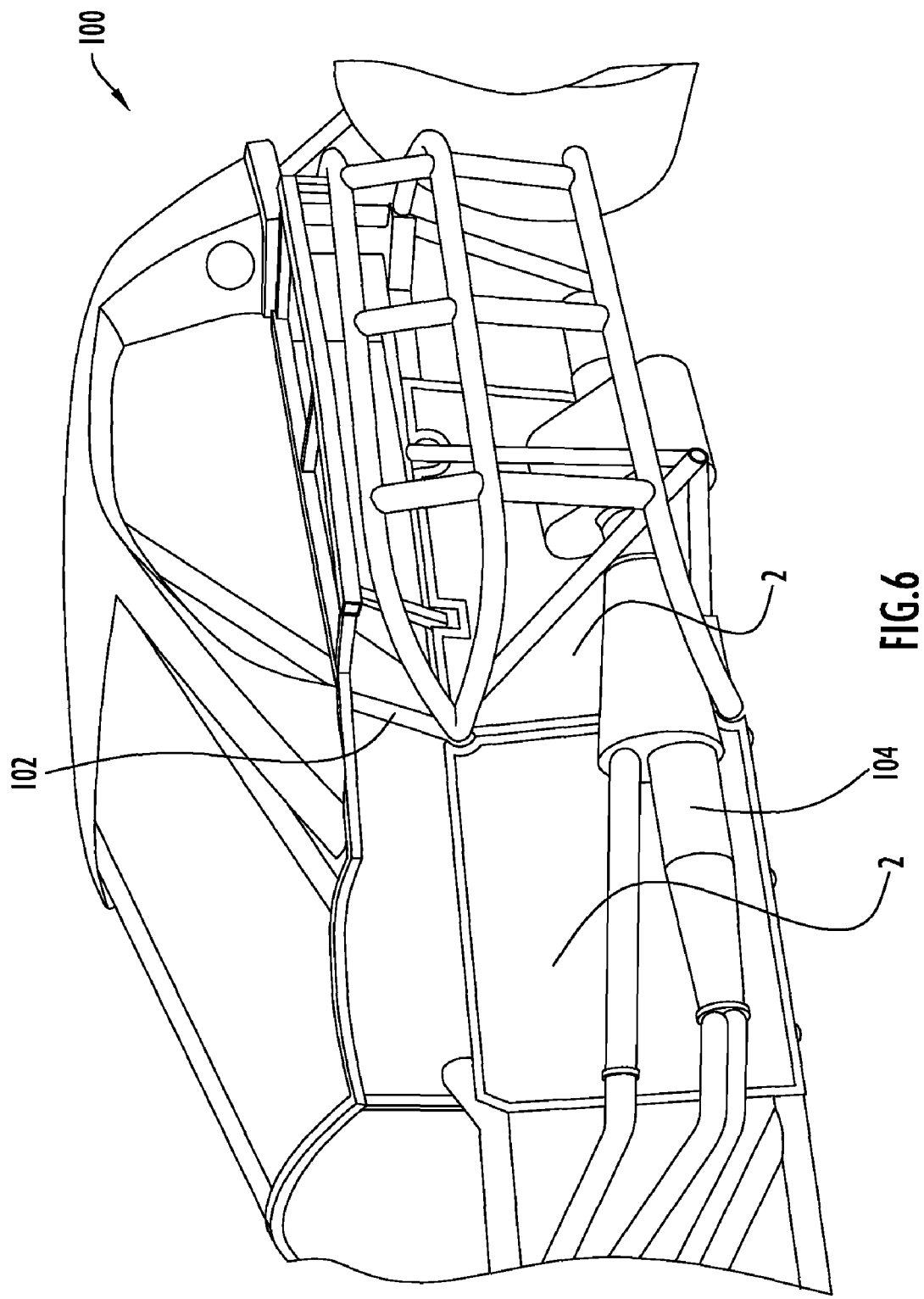
FIG. 6 is a view in perspective of an automobile incorporating a thermal barrier system along a sidewall portion of the automobile.

An example embodiment incorporating a barrier system (e.g., a system as shown in FIG. 1 or in one of FIGS. 3-5) in an automobile is shown in FIG. 6. In this embodiment, a car 100 designed for auto racing (e.g., the National Association for Stock Car Auto Racing) includes an inner frame or roll cage 102 that serves as a skeletal structure for the driver compartment and provides additional protection for the driver. The thermal barrier system 2 is incorporated into the car by securing a two or three panel system as described above to portions of the inner roll frame 102 and/or other supporting structure so as to provide a thermal barrier to the driver compartment defined within the roll frame 102. As can be seen in FIG. 6, the panels of the thermal barrier system 2 are provided between the driver compartment and exhaust header piping 104. The thermal barrier system can also be provided at any one or more other suitable locations along the driver or passenger side doors, between the engine compartment and driver compartment, etc.

Figure 7:
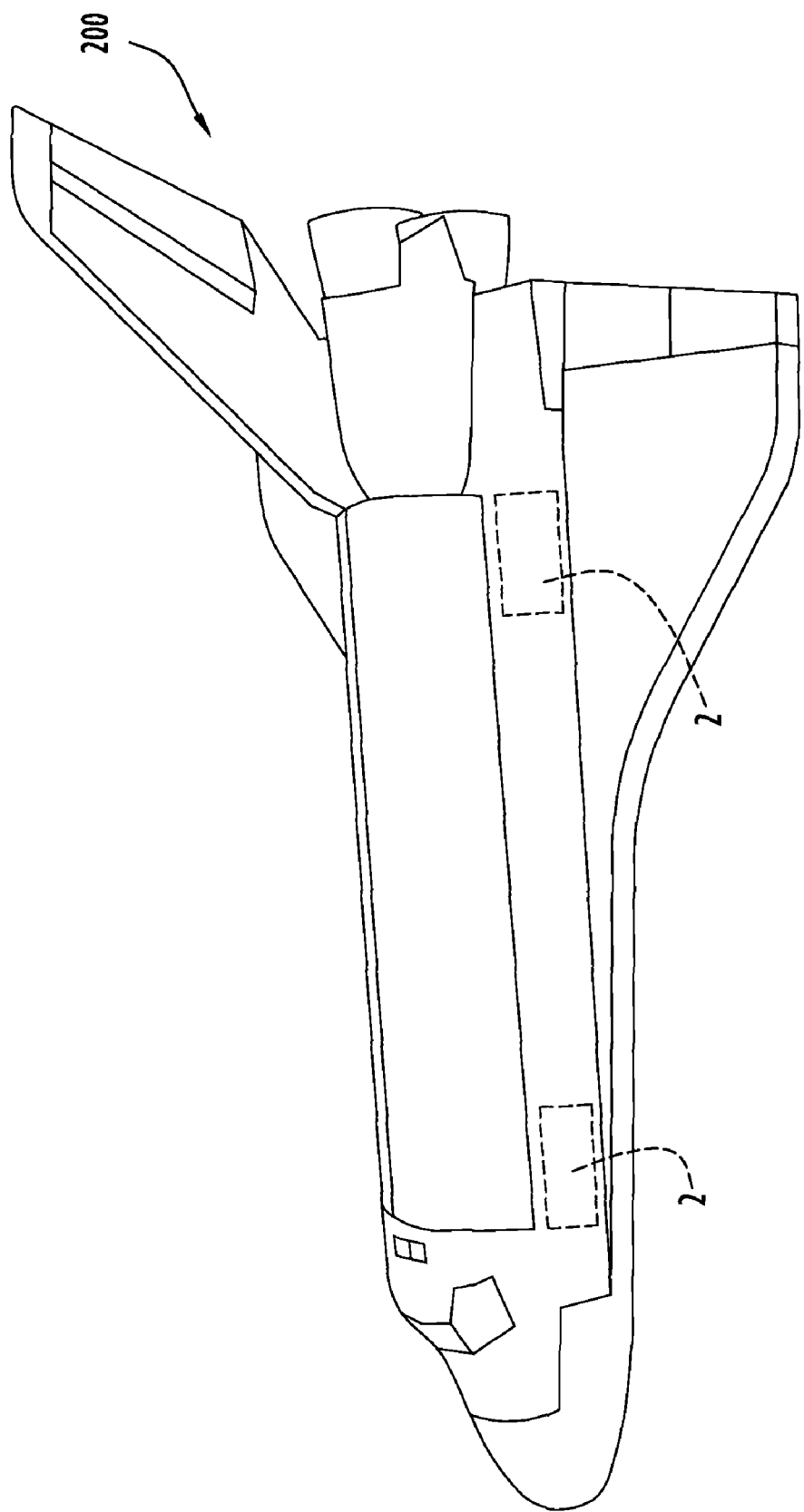
FIG. 7 is a view in perspective of a portion of an aerospace vessel incorporating a thermal barrier system along a sidewall portion of the aerospace vessel.

In another example embodiment, the thermal barrier system 2 can be provided at one or more suitable locations within wall enclosure structure of an aerospace vehicle 200 (e.g., a space shuttle) as shown in FIG. 7. Another example of an aerospace application in which the thermal barrier system can be implements is in satellite equipment.

The thermal barrier system has been tested in a Sports Car Club of America (SCCA) auto racing stock car to determine how effective the barrier system was in preventing the driver compartment from becoming overheated. A number of two and three panel thermal barrier configurations were studied for implementation or retrofitting in an auto racing stock car, and a thermal model was used to provide an indication of the temperature difference between an outer surface and an innermost surface (i.e., surface facing toward and closest to the driver compartment) of each thermal barrier under consideration. The two and three panel thermal barrier configurations were also compared with a single barrier configuration, where the single barrier configuration consisted of a single panel having a thickness of 0.375 inch (with some single panel embodiments including a reflective foil on the outer surface of the panel facing toward an external surface of the vehicle). Each panel in the different thermal barrier configurations was formed of ACUSIL II silicone syntactic foam material.

The study was based upon a 40 minute auto race in which temperatures inside the driver compartment can reach about 140-150° F. (60-66° C.), where the thermal barriers are placed at locations such as is shown in FIG. 6 (e.g., at locations between the driver compartment and header/exhaust system at or near the driver and/or passenger side door). The header/exhaust system of the car during the race can generate heat that radiates outward toward the barriers at temperatures as high as about 1000° F. (about 538° C.). Temperature gradient data for different thermal barrier systems studied under racing conditions in which the ambient temperature is about 80° F. (about 27° C.) is provided in the table below.

| Barrier Configuration | Reflective Foil Layer(s) | Temp at outer surface of first panel (° F.) | Temp at outer surface of second panel (° F.) | Barrier weight (lbs) |
|---|---|---|---|---|
| Single panel barrier | None | 892 | 507 | 3.6 |
| FIG. 1 barrier system[1] | None | 918 | 439 | 3.9 |
| Single panel barrier[1] | 3 mil Al | 694 | 399 | 3.9 |
| FIG. 3 barrier system[1] | 3 mil Al | 758 | 350 | 4.2 |
| Single panel barrier | 2 mil stainless steel | 692 | 398 | 4.2 |
| FIG. 3 barrier system[1] | 2 mil stainless steel | 755 | 348 | 4.5 |
| FIG. 4 barrier system[1] | 3 mil Al | 816 | 284 | 4.5 |
| FIG. 3 barrier system[2] | 3 mil Al | 750 | 442 | 3.2 |
| FIG. 4 barrier system[2] | 3 mil Al | 791 | 419 | 3.5 |
| FIG. 5 barrier system[3] | 3 mil Al (surface 6 of first panel 4) | 843 | 406 | 3.2 |
| FIG. 5 barrier system[3] | 3 mil Al (surfaces 6, 30, 26 of panels 4, 8, 24) | 906 | 272 | 3.9 |
| FIG. 4 barrier system[4] | 3 mil Al | 853 | 298 | 4.5 |

[1] 0.2 × 0.2 × 0.2 thickness for the stacked panel/air gap/panel barrier system.
[2] 0.15 × 0.3 × 0.15 thickness for the stacked panel/air gap/panel barrier system.
[3] 0.1 × 0.1 × 0.1 × 0.1 × 0.1 thickness for the stacked panel/air gap/panel/air gap/panel barrier system.
[4] 0.2 × 0.1 × 0.2 thickness for the stacked panel/air gap/panel barrier system.

As can be seen from the data presented in the table above, the thermal barrier system employing two or more silicone syntactic foam panels with air gaps between the panels is effective in establishing a temperature gradient between the wall surfaces of the two outermost panels of as much as about 550° F. (about 306° C.). In particular, the two and three panel thermal barrier systems are much more effective in comparison to a single panel system, where the heat transfer between the outer panel surfaces is minimized, resulting in a lower temperature in the driver compartment of at least about 20° F. (about 11° C.) in comparison to the absence of such thermal barrier system. In addition, the multiple panel thermal barrier system does not add a significant amount of mass or weight to the overall system in comparison to a single panel barrier system.

The thermal barrier systems of the invention can be utilized to insulate a compartment or structure interior from excessive hot or cold temperatures. For example, the use of the thermal barrier systems in aerospace applications can shield the interior compartment of an aerospace vehicle from excessively high temperatures during a launch sequence as well as from excessively cold temperatures that can be encountered in outer space.

Having described exemplary embodiments of connecting a thermal barrier system, variations and changes will be suggested to those skilled in the art in view of the teachings set forth herein. It is therefore to be understood that all such variations, modifications and changes are believed to fall within the scope of the present invention as defined by the appended claims.

What is claimed:

1. A thermal barrier system comprising a plurality of panels including at least two panels separated from each other so as to define an air gap between the panels, wherein each panel of the at least two panels is separated from another panel via at least one spacer structure disposed within the air gap, each panel comprises a silicone syntactic foam insulation material having a thermal conductivity in the range of about 0.023 W/(m*K) to about 0.099 W/(m*K), and each panel connects with another panel via only the at least one spacer structure and with no additional structure extending through any panel or any spacer structure.

2. The system of claim 1, wherein the silicone syntactic foam material comprises hollow silicone structures having cross-sectional dimensions in the range from about 55 microns to about 70 microns.

3. The system of claim 1, wherein the at least one spacer structure comprises a silicone syntactic foam material.

4. The system of claim 1, wherein the at least one spacer structure comprises a plurality of spacers aligned along facing surfaces of two panels and disposed within the air gap.

5. The system of claim 4, wherein the spacers are aligned to form two intersecting lines of spacers along the facing surfaces of two panels.

6. The system of claim 1, wherein each panel and spacer structure has a thickness dimension in the range from about 0.10 inch to about 0.20 inch.

7. The system of claim 1, wherein each spacer structure has a suitable thickness dimension such that the thickness of the space defined between panels is from about 0.1 inch to about 0.2 inch.

8. The system of claim 1, wherein the plurality of panels comprises at least a first panel separated from a second panel so as to define a first air gap between the first and second panels and a third panel separated from the second panel so as to define a second air gap defined between the second and third panels.

9. The system of claim 1, further comprising a reflective material provided along at least one surface of at least one panel.

10. The system of claim 9, wherein the reflective material comprises one of aluminum and stainless steel.

11. The system of claim 9, wherein the reflective material is provided along a surface of a panel defining an outer wall of the thermal barrier system.

12. The system of claim 1, wherein the insulation material has a density of no greater than about 30 lb/ft$^3$.

13. A mobile vehicle comprising:
a support structure for the mobile vehicle; and
a thermal barrier system secured to the support structure, the thermal barrier system comprising a plurality of panels including at least two panels separated from each other so as to define an air gap between the panels, wherein each panel of the at least two panels is separated from another panel via at least one spacer structure disposed within the air gap, each panel comprises a silicone syntactic foam insulation material having a thermal conductivity in the range from about 0.023 W/(m*K) to about 0.099 W/(m*K), and each panel connects with another panel via only the at least one spacer structure and with no additional structure extending through any panel or any spacer structure.

14. The mobile vehicle of claim 13, wherein the mobile vehicle comprises an automobile.

15. The mobile vehicle of claim 14, wherein the thermal barrier system is disposed between a header/exhaust system of automobile and a driver compartment of the automobile.

16. The mobile vehicle of claim 13, wherein the mobile vehicle comprises an aerospace vehicle.

17. A method of utilizing a thermal barrier system comprising:
combining a plurality of panels together including at least two panels separated from each other so as to define a space between the panels, wherein each panel of the at least two panels is separated from another panel via at least one spacer structure disposed within the air gap, each panel comprises a silicone syntactic foam insulation material having a thermal conductivity in the range from about 0.023 W/(m*K) to about 0.099 W/(m*K), and each panel connects with another panel via only the at least one spacer structure and with no additional structure extending through any panel or any spacer structure.

18. The method of claim 17, further comprising:
providing the thermal barrier system in a vehicle.

19. The method of claim 17, further comprising:
providing the thermal barrier system in an automotive vehicle at a location between a driver compartment for the automotive vehicle and an exhaust system of the automotive vehicle.

20. The method of claim 17, wherein the insulation material has a density of no greater than about 30 lb/ft$^3$.

21. The system of claim 1, wherein each panel consists of the silicone syntactic foam insulation material with no skin or other reinforcing material forming an outlet surface of each panel.

* * * * *

UNITED STATES PATENT AND TRADEMARK OFFICE
CERTIFICATE OF CORRECTION

| | | |
|---|---|---|
| PATENT NO. | : 8,056,953 B2 | Page 1 of 1 |
| APPLICATION NO. | : 12/138550 | |
| DATED | : November 15, 2011 | |
| INVENTOR(S) | : Charles John Kiskiras | |

It is certified that error appears in the above-identified patent and that said Letters Patent is hereby corrected as shown below:

Column 7, line 13, replace "range of about" with -- range from about --;

Column 8, lines 28 & 29, replace "a space" with -- an air gap --; and

Column 8, line 49, replace "an outlet surface" with -- an outer surface --.

Signed and Sealed this
Twenty-fourth Day of April, 2012

David J. Kappos
*Director of the United States Patent and Trademark Office*